United States Patent [19]

Sengupta et al.

[11] Patent Number: 5,127,973
[45] Date of Patent: Jul. 7, 1992

[54] INTERSECTION MARKINGS

[75] Inventors: Asok Sengupta, London, Canada; John L. Ethen, Oakdale, Minn.; Stanley J. Jordan, West Moors, Great Britain

[73] Assignee: Minnesota Mining and Manufacturing Company, St. Paul, Minn.

[21] Appl. No.: 550,817

[22] Filed: Jul. 11, 1990

Related U.S. Application Data

[63] Continuation of Ser. No. 372,183, Jun. 26, 1989, abandoned, which is a continuation of Ser. No. 866,570, May 29, 1986, abandoned, which is a continuation-in-part of Ser. No. 744,494, Jun. 13, 1985, abandoned, and a continuation-in-part of Ser. No. 744,495, Jun. 13, 1985, abandoned.

[51] Int. Cl.$^5$ .................................... B32B 5/16
[52] U.S. Cl. ........................... 156/60; 156/324; 428/143; 428/336; 428/412; 428/423.1; 428/500
[58] Field of Search ............... 428/220, 325, 141, 143, 428/336, 412, 423.1, 500; 524/873, 875; 523/125; 156/60, 324

[56] References Cited

U.S. PATENT DOCUMENTS

| 3,399,607 | 10/1968 | Eigenmann . |
| 3,674,746 | 7/1972 | Lohse et al. ............... 524/873 |
| 3,935,365 | 1/1976 | Eigenmann ............... 428/323 |
| 4,020,211 | 4/1977 | Eigenmann ............... 428/323 |
| 4,069,281 | 1/1978 | Eigenmann ............... 264/1 |
| 4,117,192 | 9/1978 | Jorgensen ............... 428/337 |
| 4,146,635 | 3/1979 | Eigenmann ............... 428/283 |
| 4,248,932 | 2/1981 | Tung et al. ............... 428/325 |
| 4,259,227 | 3/1981 | Ojakaar ............... 260/37 |
| 4,377,530 | 3/1983 | Trenbreath et al. ............... 260/453 |
| 4,379,767 | 4/1983 | Alexanian et al. ............... 260/453 |
| 4,490,432 | 12/1984 | Jordan ............... 428/220 |

Primary Examiner—Pamela R. Schwartz
Attorney, Agent, or Firm—Gary L. Griswold; Walter N. Kirn; Roger R. Tamte

[57] ABSTRACT

Pavement-marking sheet materials of increased durability comprise a tough, abrasion-resistant top layer, preferably a polyurethane film having substantial flexibility but including trifunctional hydroxyl-terminated components of short molecular weight so as to obtain a significant degree of crosslinking, and a conformable underlying layer. A preferred underlying layer comprises unvulcanized elastomer precursor.

30 Claims, No Drawings

INTERSECTION MARKINGS

REFERENCE TO RELATED APPLICATIONS

This is a continuation of application Ser. No. 07/372,183, filed Jun. 26, 1989, abandoned, which is a continuation of application Ser. No. 06/866,570, filed May 29, 1986, abandoned, which application is a continuation-in-part of application Ser. Nos. 744,494, and 744,495, both filed Jun. 13, 1985, and both now abandoned.

FIELD OF THE INVENTION

This invention is directed to pavement-marking sheet material which may be adhered to a roadway to provide traffic control markings and the like.

BACKGROUND ART

Traffic control markings at street intersections undergo strenuous wear. Many of the markings, such as stop bars or cross-walk markings, extend across the path of travel and are traversed by every vehicle traveling along the controlled lane of travel. Also, at an intersection, vehicles are often in a stop, start, or turning mode, and these modes increase the wear action on the markings. In many geographic areas, sand and chemical treatments are frequently applied at intersections to reduce slippery conditions, and those treatments further aggravate wear conditions.

The most common present markings are lines of traffic marking paints, thicker lines of thermoplastic polymer applied by hot-melt techniques, and preformed tapes or sheet materials adhered to the roadway. As to preformed tapes, see for example, U.S. Pat. No. 4,117,192, which teaches a pavement-marking sheet material comprising a deformable reduced-elasticity polymeric base sheet and a thin support film adhered to the top of the base sheet and having retroreflective elements partially embedded in it. Also, see U.S. Pat. No. 4,248,932, which teaches sheet material that comprises a conformable base sheet such as a dead-soft aluminum foil or a reduced-elasticity polymeric base sheet, and a flexible top layer adhered to the base sheet such as an epoxy-based polymeric system or a polyurethane polymeric system (Example 2); glass microspheres or other particulate material is partially embedded in the top layer, which has a thickness designed to accommodate the particulate material (column 4, lines 12-17).

Although both the thicker thermoplastic lines and the preformed tapes offer significantly better resistance to wear than painted lines, additional resistance and longer-lived markings continue to be desired.

DISCLOSURE OF INVENTION

It has been found that a pavement marking of much longer life can be obtained with a composite sheet material that comprises a tough abrasion-resistant long-wearing top film or layer and an underlying conformable layer that adapts the sheet material to be adhered to a roadway. The top layer is a critical component of such a sheet material, and the present invention provides top layers having properties that make possible long-lived pavement markings.

Briefly summarized, in a preferred pavement-marking sheet material of the present invention, the top surface is provided by a flexible, tough, abrasion-resistant polymeric layer or film that comprises aliphatic isocyanate-terminated component and hydroxyl-terminated component reacted to an infusible and insoluble polyurethane reaction product, at least 10 percent of the hydroxyl equivalents being provided by hydroxyl-terminated component having at least three hydroxyl groups per molecule, and the hydroxyl-terminated component having a number-average molecular weight of about 1,200 or less.

As illustrative of its abrasion-resistance and flexibility, the polymeric top layer in preferred pavement-marking sheet materials of the invention exhibits a Taber abrasion loss using an H-22 abrader wheel with a 1,000-gram weight and 1,000 cycles of no more than about one-half gram, and is sufficiently flexible that it can be wrapped around a 2-centimeter-diameter mandrel at room temperature without cracking. Transparent microspheres are preferably partially embedded in and partially protrude from the top layer, and preferably are dispersed throughout the top layer; abrasive or antiskid granules are also preferably partially embedded in the top layer and dispersed throughout the top layer.

The conformable layer underlying the top layer has a combination of properties that can generally be indicated by a penetration creep-recovery test described herein. In general, the conformable layer will undergo a penetration in this test of at least 0.05 millimeter, and will recover no more than 65 percent of the penetration depth after two minutes. The conformable layer should be thick enough to accept the typical irregularities of a paved surface and flow so as to extensively fill in the space between the generally smooth and flat top layer and the paved surface. Preferably, the conformable underlying layer comprises a reduced-elasticity composition based on unvulcanized elastomer precursor, such as described in U.S. Pat. Nos. 4,117,192 or 4,490,432.

Based on initial laboratory testing, a composite pavement marking sheet material as described can achieve pavement markings of unusually long life. Even though the top layer or film is tough and elastic and tends to return to its original shape after being strained, which is a characteristic that tends to loosen such a layer or film if it is adhered by itself to a roadway, the composite sheet material is capable of being lastingly adhered to a roadway. And when adhered in that manner, the top layer provides long-lasting distinctly visible pavement markings.

Such adhesion is achieved even though the top layer is preferably rather thick, i.e., generally one-third millimeter or more in thickness, to achieve the best wear properties. The particular thickness is generally chosen in connection with the particular use that is to be made of the sheet material, and for some uses such as down-the-road lane striping, which undergo a lower number of contacts by vehicle tires, the top layer can be less thick, e.g., as thin as 0.1 millimeter. Sheet material of the invention exhibits previously unattainable long life at intersections, but it is useful in generally all traffic-control pavement markings and offers long life for those applications as well.

DETAILED DESCRIPTION

The isocyanate-terminated component of the sheet material of the invention should be an aliphatic compound, since such compounds show less discoloration than aromatic compounds during outdoor weathering. The isocyanate-terminated component should have at least two isocyanate groups per molecule, and depending on the functionality of the hydroxyl-terminated component, may have greater functionality, so that the component can be reacted with the other components in the system to form a crosslinked network. The isocyanate groups should be in approximate stoichiometric balance with the hydroxyl groups. Desirably, there is a slight excess of isocyanate groups per hydroxyl group to achieve a desired level of crosslinking; but the proportions can vary from a slight deficiency of isocyanate groups per hydroxyl group to a larger excess of isocyanate groups per hydroxyl group.

The preferred isocyanate-terminated component is 4,4'-methylene bis (cyclohexylisocyanate). Other useful isocyanate-terminated compounds include ethylene diisocyanate; trimethylene diisocyanate; tetramethylene diisocyanate; 1,3 and 1,4 cyclohexyl diisocyanate; 1, 6 hexamethylene diisocyanate; 3-isocyanatomethyl 3,5,5 trimethyl cyclohexyl isocyanate; 1,4 bis (isocyanatomethyl) cyclohexane; and 1,3 bis (isocyanatomethyl) cyclohexane. Compounds that function as if they were aliphatic are also useful, such as isomers of tetramethylxylylene diisocyanate. Those isomers have aromatic rings which are not bonded directly to the isocyanate groups but are bonded to a hydrogen-free carbon atom (compounds of this type are described in U.S. Pat. Nos. 4,377,530 and 4,379,767).

The preferred hydroxyl-terminated component is a mixture of polycaprolactone glycols, some with diol functionality and some with triol functionality, and shorter-chain diols (i.e., having 2 to 10 carbon atoms). Polycaprolactone-based hydroxyl-terminated component offers superior physical properties such as better resistance to degradation by ultraviolet exposure and flexibility of the layer at low temperatures. Other useful hydroxyl-terminated components include hydroxyl-terminated polycarbonates such as aliphatic hydroxyl-terminated polycarbonate diol (such as Duracarb 122 obtained from PPG Industries which has an average hydroxyl number of 110 and a number-average molecular weight of 1,000) or less desirably, polyethers such as polytetramethylene ether glycol. Also, hydroxyl-terminated acrylics such as acrylic oligomers designed for thermosetting coatings or inks (such as Joncryl 569 obtained from S. C. Johnson and Son, Inc.) may be used.

The top layer of a sheet material of the invention is preferably a crosslinked reaction product (for example, when immersed in a solvent such as dioxane, the top layer at most swells and does not dissolve). This crosslinked nature is believed to contribute to the abrasion-resistance of the sheet material as well as to another advantageous feature of pavement markings of the invention, namely their resistance to discoloration from tires that travel over the marking. Some markings tend to absorb oils or other colorants from the tires, whereupon they become darkened and lose the contrast with the background color of the roadway that is desired for best visibility. Markings of the invention resist such discoloration, and the more highly crosslinked the polyurethane reaction product in the top layer is, the better the markings resist such discoloration.

Desired crosslinking is obtained by including at least trifunctional ingredients in the reaction product, e.g., ingredients that carry at least three hydroxyl groups per molecule. At least 10 percent, and most preferably at least 25 percent, of the hydroxyl equivalents in the polyurethane reaction product should be provided by hydroxyl-terminated component having at least three hydroxyl groups per molecule.

Resistance to discoloration is further provided through use of hydroxyl-terminated component that has a number-average molecular weight of about 1,200 or less, and preferably about 1,000 or less. With such a low segment length, the polymer molecules within the reaction product are tightly connected and more resistant to absorption of discoloring oils. The number-average molecular weight of hydroxyl-terminated component having three or more hydroxyl groups per molecule is preferably about 650 or less.

The inclusion of tertiary amine in the reaction product of the top layer further improves resistance to discoloration. Other workers have taught benefit in using tertiary amines in polyurethane products; see U.S. Pat. No. 4,259,227, which teaches the manufacture of tire sidewalls from a polyurethane composition that comprises 4,4'-methylene bis (cyclohexyl isocyanate) and one or more polyols, and an adduct of an aliphatic diisocyanate with N-(t-butyl) diethanolamine and bis(2,2',6,6'-tetramethyl-4-piperidine) sebacate. When tested as a pavement marking, compositions as taught in the stated patent do not achieve the level of whiteness retention achieved in products of the present invention, apparently because of a lack of crosslinking as used in products of the present invention and also because the level of tertiary amine is quite low. By the present invention it is found that the addition of tertiary amine, preferably in larger amounts than taught in U.S. Pat. No. 4,259,227 (e.g., use of alkylalkanolamine in amounts equal to 0.5 hydroxy equivalent for each hydroxy equivalent of diol in the polyurethane reaction product) can improve whiteness retention. The preferred tertiary amine is N-(tertiary butyl) diethanolamine, but other tertiary amines such as triisopropanol amine can also be used. N-(methyl)diethanol amine will improve resistance to tire discoloration, but also increases sensitivity to discoloration from ultraviolet exposure, and products using that amine are best used in applications that minimize such exposure.

Shorter-chain diol is desirably includes in polymeric top layers to make the layers harder, which increases resistance to dirt accumulation on the surface of the marking. One especially useful short-chain monomeric diol is 1,4 cyclohexyl dimethanol which has been used in products of high resistance to tire discoloration. This ingredient may not only give the layer greater hardness, but also may provide some crystallinity to the layers. Another useful short-chain diol is 1,4 butane diol.

In addition to the described ingredients, the composition of the top layer of pavement-marking sheet materials of the invention can include a variety of additives, inert fillers, extenders, and pigments, generally in the same kinds and proportions as used in prior art traffic-control marking materials. Such materials include aluminum, calcium, or magnesium silicate (e.g., talc); calcium carbonate; calcium meta silicates; calcium sulfate; amorphous or crystalline silica; zinc oxide; lead chromate; and zirconium oxide. Rutile titanium dioxide is a desired pigment and filler to provide a white color and to provide a somewhat reflective background for microspheres partially embedded in sheet material of the invention. The additives may be treated to achieve improved properties; for example, inorganic oxides may be treated with a coupling agent such as a silane coupling agent to improve bonding to the polyurethane polymers. Antioxidants such as tris (3,5-di-t-butyl-4 hydroxybenzyl) isocyanurate (Goodrite 3114 available from B. F. Goodrich) sterically hindered phenol Irganox 1010 or 1076 available from Ciba-Geigy); stabilizers such as Cyasorb UV3346 available from American Cyanamid, sterically hindered amine (Tinuvin 770 and 144 available from Ciba-Geigy) and 1,1'-(1,2-ethanediyl)bis (3,3,5,5-tetramethyl piperazinone (Goodrite 3034 available from B. F. Goodrich) are desirably included to provide resistance to ultraviolet or thermooxidative degradation. Typically, these materials amount to about 3 to 20 parts by weight per 100 parts of the polymeric ingredients in sheet materials of the invention.

Most typically, in a sheet material of the invention, the top layer will have transparent spheres partially embedded in the layer and partially protruding from the layer to provide retroreflectivity. Such spheres will generally be arranged in a monolayer and will be scattered in a spaced-apart manner so that significant parts of the top layer are revealed to oncoming motorists. It is desired that the marking be of a distinctive color, such as a white color, and for such purposes the total surface of the marking should generally not be covered with spheres or other particulate material. Since the polymeric top layer in sheet material of the invention can generally be made without including solvents or other diluents in the ingredients, a surface configuration of the layer like that described in U.S. Pat. No. 4,248,932 can be achieved.

It is also typical to include abrasive or antiskid granules partially embedded in and partially protruding from the top layer to provide skid resistance for the pavement marking. Typically, it is desired that a pavement marking exhibit a residual skid resistance in the British Portable Skid Resistance test of at least 50 BPN. Suitable abrasive or antiskid granules are white aluminum oxide granules. It has been found that a blend of fine aluminum oxide particles and larger aluminum oxide particles provides best results. The fine granules tend to remain in place better and for longer periods of time, whereas the larger granules provide desired frictional properties.

Both spheres and antiskid granules are also preferably dispersed through the top layer so that as portions of the layer wear away, additional spheres and abrasive granules are exposed. The microspheres generally average 50 to 500, preferably 100 to 300, micrometers in diameter, and have an index of refraction of about 1.5 to 2.0, preferably 1.75 to 1.95.

The described top layer or film in sheet material of the invention should exhibit certain physical properties to obtain desired long-lived markings. One property is abrasion resistance. Preferred top layers or films exhibit a weight loss of no greater than about one-half gram, more preferably no greater than about one-fourth gram, when tested with a Taber Abrader using an H22 wheel with a 1,000 gram weight and 1,000 cycles (the test described in ASTM C-501 is used, except the results are expressed in amount by weight of film lost; the test is performed on the film without the previously referred to monolayer of partially protruding, partially embedded microspheres or antiskid granules).

The best durability on the roadway is achieved when the top layer is flexible, especially when used in combination with a conformable underlying layer. For this reason, a film useful as the top layer in a sheet material of the invention should be sufficiently flexible that it can be wrapped around a 2-centimeter-diameter mandrel at room temperature, and preferably at −10° C., without cracking, and preferably can be so wrapped around a 5-millimeter-diameter mandrel without cracking. Wrapping is done manually with moderate wrapping speed, such that the film is wrapped around the full circumference of the mandrel within a few seconds.

The top layer should also be tear-resistant. Prior-art pavement-marking films having tear resistance of less than about 3 kN/m in a test for tear resistance of plastic (ASTM Test D-624, using as a tear die, a Die B having dimensions half those stated in ASTM D-624 with the samples being nicked one millimeter before tearing, and an X-head speed of 50 millimeters/minute) do not provide desired long life. Top layers of films of the invention generally exhibit a tear resistance of at least about 5 kN/m, and preferably at least about 10 or 20 kN/m.

Impact-resistance is another aspect of toughness. Prior-art pavement-marking films which develop a pattern of cracks when impacted with less than one joule of impact energy in a Gardner Impact test (using a one-kilogram weight which falls through a one-meter-high graduated Sloter tube on a tup of 15.8-millimeter diameter; the sample rests on a flat anvil with the tup touching the other side) do not achieve desired long life. Preferred top layers or films of the invention do not show cracks in such a test until impact energies of about 2 to 5 or greater joules.

The thicker the top layer, the longer wearing it is, and up to certain thicknesses the increase in wearability is disproportionate with the increase in thickness; i.e., a layer that is twice as thick as another layer will last more than twice as long as that layer. Preferably, a top layer of the invention is at least about one-third millimeter in thickness and more preferably is at least about 0.4 to 0.4 millimeter in thickness.

As previously indicated, the top layer of the present invention is preferably used in combination with a conformable bottom layer, such as the reduced-elasticity sheets taught in U.S. Pat. Nos. 4,117,192 or 4,490,432 (which are incorporated herein by reference). The underlying layer need not contain microspheres or abrasive granules, which tend to stiffen the layer.

The underlying layer more fully conforms to an irregular surface such as a paved surface than the top layer conforms under equivalent pressure. The desired properties can be indicated by a penetration creep-recovery test. In the test used herein, which is based on isothermal thermomechanical analysis, a probe is placed in contact with a sample of the material to be tested, a load placed on the probe, and penetration of the probe into the sample monitored. After a time, the load is removed from the probe and the probe position monitored as the sample is allowed to recover. Our testing was carried out in a helium atmosphere using a Perkin Elmer TMS-1 thermomechanical analyzer module controlled by a Perkin Elmer DSC-2 temperature programmer. The flat-point penetration probe assembly was used.

Samples of the materials to be tested are prepared so as to have a uniform sample thickness of approximately 0.8 millimeter and approximately 3-millimeter-by-3-millimeter area dimensions. The cut sample is transferred to a small aluminum pan and placed on the sample platform of the thermomechanical analyzer.

A load of one gram is placed on the probe and the probe released and allowed to fall onto the sample. After about 3 to 5 seconds of contact with the sample, the one gram load is removed and the sample allowed to relax. This results in the probe tip resting on the sample in a zero-loading condition. The temperature control chamber of the thermomechanical analyzer is raised to surround the sample platform and bring the sample to thermal equilibrium at the desired temperature of the test (generally about room temperature or up to 30° C., which is a typical temperature for roadways during installation of sheet material of the invention). The sample is allowed to equilibrate at the test temperature for approximately five minutes with the probe still in contact with the sample surface in a zero-loading condition.

Data acquisition of the probe position is then begun, with the probe still under a load of zero to establish the zero-load baseline. After a short time, approximately 20 seconds, a mass of 20 grams is placed on the probe and the probe deflection monitored as it penetrates into the sample. The load is allowed to remain on the sample for two minutes, after which the 20-gram mass is removed from the probe to again attain a zero-load condition for the recovery step of the test. Sample recover is monitored for at least two more minutes. The amount of penetration two minutes after the load was applied and the percentage of recovery two minutes after the load is removed are measured from creep-recovery data traces obtained in the experiment. In a test as described, it has been found that for useful conformably layers, the probe generally penetrates at least 0.05 millimeter, and preferably penetrates at least 0.08 millimeter. Such penetration values indicate that the layer will achieve needed conformability under the pressure of application used to apply the sheet material and under typical subsequent pressures from vehicles traveling on the roadway. The top layer in sheet material of the invention is preferably hard, and undergoes a penetration of less than 0.05 millimeter in the described test.

On the other hand, to minimize the elastic recovery that would loosen sheet material from the roadway, the conformable layer should recover after removal of the load no more than 65 percent of the distance to which the probe has penetrated, and preferably no more than 50 percent of the penetrated distance.

The reduced-elasticity sheets taught in U.S. Pat. Nos. 4,117,192 or 4,490,432 generally include unvulcanized elastomer precursor (i.e., a polymer that if vulcanized, crosslinked or cured would form an elastomer, or a material that when stretched twice its original dimensions and the stretching force removed rapidly returns to substantially its original dimensions) such as acrylonitrile-butadiene polymers, millable urethane polymers, neoprenes, and polyacrylates. In unvulcanized form, these polymers provide desired deformation properties, and they are desirably included in an amount of at least 50 weight-percent of the polymeric ingredients in the layer. The conformable layer can also include extender resins such as chlorinated paraffins, hydrocarbon resins or polystyrenes; a thermoplastic reinforcing polymer such as polyethylene (see U.S. Pat. No. 4,490,432); particulate fillers such as coloring pigments (e.g., titanium dioxide) or reinforcing fillers (e.g., spherical silica or magnesium silicate); and various kinds of additives.

When used, the conformable layer is generally thick enough so that the material of the layer can flow into crevices in the paved surface and develop contact with an extensive portion of the whole irregular paved surface. In general, the conformable layer should be at least one-fourth millimeter in thickness and preferably it is at least one-half millimeter in thickness. Consistent with the properties of conformability discussed above, the conformable layer is preferably a stretchable or flowable material. For example, the conformable layer is preferably capable of being stretched at least 50 percent before break at a strain rate of 0.2 centimeter second.

In most embodiments of the invention, an adhesive is carried on the bottom of sheet material of the invention for the purpose of adhering the sheet material to a paved surface. Pressure-sensitive adhesives are preferred, and in combination with the conformance of the conformable layer provide good adhesion to a roadway. Contact adhesives can also be used to adhere the sheet material to a roadway.

The top layer of the invention can also be used on a dead-soft aluminum sheet. Also, for some marking situations, a pavement-marking film or layer of the invention can be adhered directly to a roadway, as with a contact adhesive that has greater holding force than the elastic force that tends to return a strained film or layer of the invention to its original shape and position.

The invention will be further illustrated by the following examples.

EXAMPLES 1 AND 2

A film useful as the top film in pavement marking sheet material of the invention was prepared from the following ingredients.

TABLE I

| Ingredients | Parts by Weight | Equivalents |
| --- | --- | --- |
| 4,4'-methylene bis (cyclohexylisocyanate) (Desmodur W supplied by Mobay Chemical Company) | 42.69 | 0.32 |
| Polycaprolactone diol having an average molecular weight of 830 with a hydroxyl equivalent weight of 412.5 (PCP0210 supplied by Union Carbide) | 33.47 | 0.08 |
| Polycaprolactone triol having an average molecular weight of 540 and a hydroxyl equivalent weight of 179.8 (PCP0305 supplied by Union Carbide) | 14.7 | 0.08 |
| 1,4 butanediol | 1.84 | 0.04 |
| N-(t-butyl)diethanolamine | 7.3 | 0.09 |
| | 100.0 | |

In the above formulation, the NCO/OH equivalent ratio was between 1.06/1 and 1.1/1. Also, in the above formulation, the amount of N-(t-butyl)diethanolamine was equal to 1.1 hydroxyl equivalent for each one hydroxyl equivalent of polycaprolactone diol. Another formulation (Example 2) was prepared in which N-(t-butyl) diethanolamine was included in an amount sufficient to provide 0.5 equivalent per equivalent of polycaprolactone diol.

One hundred parts of the hydroxyl-terminated ingredients were mixed together with 20 parts by weight of titanium dioxide, 50 to 70 parts by weight of glass microspheres having an index of refraction of about 1.5 to 1.75 and a size range of about 70 to 140 mesh (U.S. Screen size, equals about 100 to 210 micrometers in diameter), 25 parts by weight of aluminum oxide particles of about 100 to 1,200 micrometers, 0.85 part of bis (1,2,2,6,6, pentamethyl-4-piperidinyl) sebacate (Tinuvin 292 supplied by Ciba-Geigy) 0.1 part of triethylene glycol-bis-3/3-t-butyl-4 hydroxy-5 methyl phenyl propionate antioxidant (Irganox 245 supplied by Ciba- Geigy), 1.5 part of 2,2',6,6'-tetra isopropyldiphenyl carbodiimide (Staboxol-M supplied by Mobay Chemical Corporation) and 0.08 part of dibutyl tin dilaurate catalyst. (Higher or lower amounts of catalyst can be used depending on the temperature conditions and the speed of the gel time desired.) These components were mixed in a suitable container and kept at 90° C. Thereupon, the diisocyanate was added and the product mixed by a mechanical mixer for 20-25 seconds. The mixture was cast onto a release paper liner to form a film of about 0.6 millimeter thickness, which was cured at room temperature for five days and postcured at 70° C. for 12 to 16 hours. The mixture can also be cast directly onto a conformable layer and cured in place to form a composite two-layer sheet material.

As an alternative to the procedure described above, portions of the hydroxyl-terminated or polyol component may be reacted with portions or all of the isocyanate-terminated component to form an isocyanate-rich prepolymer, which is then reacted with the remaining ingredients.

Samples of the prepared film were tested in a vehicle wheel simulator which comprises a circular track around which are driven two wheels attached to opposite ends of an axle that is pivoted at the center of the track. Wheels used during testing conducted on products of this and other examples were commercial tires for a passenger vehicle, including a standard steel-belted radial tire (General Tire P205 75R14) and a steel-belted radial snow tire (B. F. Goodrich Trailmaker P205 75R14). The samples were mounted to extend transversely across the path of the wheels as they were driven around the circular track.

The coloration of the samples was measured with a Hunter Colorimeter after the samples had experienced 275,000 hits by the wheel. Values for "L", which measures lightness and varies from 100 for perfect white to 0 for black, "a" which measures redness when a positive reading, gray when a zero reading, and greenness when a negative reading, and "b" which measures yellowness when a positive reading, were measured. Desired pavement markings will exhibit an "L" reading of at least 67 and a "b" reading no more than about 9 or 10 in this test. Results are shown in Table VI.

The samples could be repeatedly wrapped around a two-centimeter-diameter pipe at −30° C. without cracking and also could be repeatedly bent 180° or folded on themselves at room temperature without cracking.

For the filled film products of Example 1, the tensile strength was 1153 pounds per square inch (8.2 MPa), the abrasion resistance in an H22 Taber Abrader varied for different samples from 0.1 to 0.28 gram loss using a 1,000 gram weight and 1,000 cycles, and the Shore A hardness of the sample was about 91. Films like those of this example but without the fillers, glass microspheres, aluminum oxide particles and other additives listed above were also tested in the abrasion-resistance test and exhibited about 0.033 gram loss.

In the tear-resistance and impact-resistance tests described above, filled films like those prepared in this example have exhibited a tear resistance of 36 kN/m and showed no cracks under impacts of up to 6 joules and only minor cracks at 8 joules (the films tested for tear resistance had a thickness of about one-fifth millimeter, meaning that disregarding thickness their tear resistance was about 7.8 Newtons; in such absolute numbers, tear resistances of about 2 or more, and preferably about 5 or more Newtons are desirable).

EXAMPLE 3

A conformable layer was prepared by mixing the ingredients shown in Table II in an internal mixer, such as a Banbury mixer, where they reached a temperature of approximately 150° C. The material was then cooled and calendered into a sheet about three-quarters millimeter thick.

TABLE II

| Ingredients | Parts by Weight |
| --- | --- |
| Acrylonitrile-butadiene non-crosslinked elastomer precursor ("Hycar 1022" supplied by B. F. Goodrich) | 100 |
| Pellets of low-density polyethylene having a melt index of 57 (grams/10 minutes) (supplied by U.S. Industries) | 40 |
| Chlorinated paraffin ("Chlorowax 70-S" supplied by Diamond Shamrock) | 45 |
| Chlorinated paraffin ("Chlorowax 40") | 13 |
| Fibers of polyester having a molecular weight ranging between 30,000 and 150,000 | 5 |
| Titanium dioxide pigment ("Tipure" R 960) | 130 |
| Talc platelet filler particles averaging 2 micrometers in size and having a surface area of 25 square meters per gram ("Mistron Superfrost" supplied by Cyprus Industries) | 37.5 |
| Transparent glass microspheres averaging about 100 micrometers in diameter and having an index of refraction of 1.5 | 280 |
| Spherical silica reinforcing filler ("Hisil 233" supplied by PPG Industries) | 2.5 |
| Stearic acid release agent | 1.5 |
| Ultramarine Blue | 0.5 |
| Chelator ("Vanstay SC" supplied by Vanderbilt) | 0.5 |

A mixture of top layer ingredients described in Example 1 was cast onto the calendered conformable layer to form a layer of about 0.6 millimeter thickness, and after additional heating of the layer for about 8 minutes in an oven heated to 150° to 225° F., additional of the glass microspheres and abrasive granules were cascaded onto the top layer in an amount sufficient to cover about 40 percent of the surface area of the top layer. The coated layer was then cured at room temperature for five days and preferably postcured at 70° C. for 12 to 16 hours.

Samples of the composite product were successfully tested in a vehicle wheel simulator.

In the penetration creep-recovery test, the conformable layer exhibited a penetration of 0.097 millimeter and a recovery of 44.9 percent. By contrast, the top layer exhibited a penetration of 0.044 millimeter and a recovery of 74 percent. As reflected by these values, the penetration of the top layer is generally less than 0.05 millimeter and its recovery is generally more than 65 percent.

A further test was conducted on the layers and composite assembly to indicate their nature, namely, an impact rebound test. In this test, the rebound of a marble dropped onto the layers or composite assembly was measured by photography. A block of concrete was used as a "blank." The marble was 1.7 centimeters in diameter and weighed 6.5 grams and was dropped from a height of one meter. The height of the bounce was recorded using a still camera with an open shutter. A meter-stick was present in the picture setting for making height measurements.

The numbers recorded are the height of the top of the marble in centimeters minus the 1.7-centimeter diameter of the marble.

The energy of the impact of the marble was calculated using basic physical relationships.

$$\begin{aligned} \text{Energy} &= \text{Work exerted on the marble} \\ &= \text{Force exerted on marble} \times \text{Distance travelled} \\ \text{Force} &= \text{mass} \times \text{acceleration due to gravity} \end{aligned}$$

$$W = Fd$$

$$F = ma_g$$

$$W = ma_g d$$

The amount of energy absorbed during the bounce may be calculated by substituting the height of the bounce, h, for d in the above equations.

$$\text{mass, } m = 0.00651 \text{ kg}$$

$$\text{distance, } d = 1 \text{ m}$$

$$a_g = 0.981 \text{ m s}^{-2}$$

$$\text{energy of marble on impact} = (0.00651)(1)(0.981) = 0.00639 \text{ J}$$

Some of the above data for the marble bounce experiment is summarized in Table III.

TABLE III

| Material | Height, h (cm) | Energy (J) Of Bounce | % of Energy Absorbed By Material |
|---|---|---|---|
| Concrete | 32.1 | 0.00205 | — |
| Top Layer | 17.6 | 0.00112 | 45.4 |
| Conformable Layer | 4.7 | 0.00030 | 85.4 |
| Composite | 8.6 | 0.00055 | 73.2 |

The measurements suggest that the marble in the test will generally bounce no more than about 13 centimeters, and preferably no more than about 8 centimeters (measured to the top of the marble), in a test of useful conformable layer materials.

EXAMPLE 4

Example 1 was repeated using the ingredients listed below in Table IV, with results as reported in Table VI.

TABLE IV

| Ingredients | Parts by Weight |
|---|---|
| 4,4'-methylene bis (cyclohexylisocyanate) (Desmodur W supplied by Mobay Chemical Company) | 44.45 |
| Polycaprolactone diol having an average molecular weight of 830 with a hydroxyl equivalent weight of 412.5 (PCP0210 supplied by Union Carbide) | 32.44 |
| Polycaprolactone triol having an average molecular weight of 540 and a hydroxyl equivalent weight of 179.8 (PCP0305 supplied by Union Carbide) | 14.25 |
| 1,4 butanediol | 1.78 |
| N-(methyl)diethanolamine | 7.07 |
| | 100.00 |

EXAMPLE 5

Example 1 was repeated except that polycaprolactone triol having an average molecular weight of 300 (PCP0301 supplied by Union Carbide) replaced the polycaprolactone triol PCP 0305. Also, the 1,4 butane diol was omitted. There was 0.768 hydroxyl equivalent of amine per equivalent of hydroxyl-terminated diol. The Hunter Colorimeter measurements are given in Table VI.

EXAMPLE 6

Example 4 was repeated except that N-(methyl)diethanolamine was used in place of the N-(t-butyl)diethanolamine. The Hunter Colorimeter measurements are given in Table VI.

EXAMPLE 7

Example 1 was repeated with the ingredients listed below in Table V and with results as given in Table VI.

TABLE V

| Ingredients | Parts by Weight |
|---|---|
| 4,4'-methylene bis (cyclohexylisocyanate) (Desmodur W supplied by Mobay Chemical Company) | 40.23 |
| Polycaprolactone diol having an average molecular weight of 830 with a hydroxyl equivalent weight of 412.5 (PCP0210 supplied by Union Carbide) | 36.13 |
| Polycaprolactone triol having an average molecular weight of 540 and a hydroxyl equivalent weight of 179.8 (PCP0305 supplied by Union Carbide) | 15.75 |
| 1,4 cyclohexyl dimethanol (CHDM-R) from Eastman Kodak Company) | 7.89 |
| | 100.0 |

TABLE VI

| | L | a | b |
|---|---|---|---|
| Example 1 | 89.2 | −4.4 | +7.0 |
| Example 2 | 90.5 | −2.67 | +7.94 |
| Example 4 | 89.5 | −3.5 | +7.5 |
| Example 5 | 72.9 | −0.5 | +8.6 |
| Example 6 | 78.6 | −0.9 | +7.5 |
| Example 7 | 89.9 | −3.9 | +7.3 |

EXAMPLE 8

A different top layer useful in some composite sheet materials of the invention was prepared by first thoroughly mixing 130 grams of amine-terminated acrylonitrile butadiene polymer (Hycar 1300X16 supplied by B. F. Goodrich) and 40 grams of a polyamide resin having an equivalent weight of 1457 (Versamid 1540 supplied by General Mills Chemical, Inc.) at a temperature of 70° C. A second mixture was prepared by heating 100 grams of diglycidyl ether of bisphenol A having an epoxide equivalent weight of approximately 235 (Eponex resin DRH1510 from Shell Chemical Company) to 70° C., and then dispersing 60 grams of titanium dioxide pigment (Tipure R-960) into the epoxy resin with a high-speed mechanical stirrer. Dispersion was checked using a grind gauge until the reading was over four. The two mixtures were then combined while they were maintained at 70° C. and mixed thoroughly for two minutes. Thereupon, 190 grams of glass microspheres (70-140 mesh, 1.5 index) and 60 grams of aluminum oxide (grit size 80) were added to the mixture. Both the glass microspheres and aluminum oxide granules had been treated with a silane coupling agent (A-187 supplied by Union Carbide) and dried to eliminate excess moisture. The whole blend was degassed for 15 minutes and coated onto a conformable layer as described in Example 1.

In the abrasion resistance test, the film exhibited a loss of 0.1649 gram and the film also exhibited a Shore A hardness of 85.

EXAMPLE 9

A top layer useful in some composite sheet materials of the invention was prepared by heating 91.15 grams of a hydroxyl-terminated butadiene-acrylonitrile polymer (Hycar HTBN1300X29 supplied by B. F. Goodrich) to 100° C. and mixing it thoroughly into a mixture of 6.65 grams (0.0738 mol) of 1,4 butane diol having an equivalent weight of 45.05 and 2.20 grams (0.0164 mol) of trimethylpropane having an equivalent weight of 44.67. The equivalent ratio for the hydroxy-terminated polymer, trimethylpropane, and 1,4 butane diol was 1:1:3. The mixture was degassed for 15 to 20 minutes after which the following were added one by one: 1.5 grams Tinuvin 292 from Ciba Geigy, 0.3 gram Irganox 245 from Ciba Geigy, and 0.1 gram dibutyl tin dilaurate catalyst, and mixed thoroughly for two minutes.

The prepared mixture was heated again to maintain a temperature of 70° C. whereupon previously dried 20 grams titanium dioxide (Tipure R-960) and three grams of powdered molecular sieves (type 4A) were added to the mixture. The titanium dioxide was dispersed by a high speed mechanical stirrer under nitrogen. Thereupon, 50 grams of glass microspheres (70-140 mesh, 1.5 index) and 30 grams aluminum oxide granules containing equal amounts of grit 80 and grit 90 sizes were added. Both the glass microspheres and aluminum oxide granules had been treated with a silane coupling agent. The mixture was heated at 70° C. and degassed for 30 minutes.

After the degassed sample had been heated further to 90° C., 35.7 grams of isocyanate-terminated monomer (35.7 grams of Desmodur W supplied by Bayer Chemicals) was added with continuous stirring. After 25 seconds of stirring, the mixture was poured onto a conformable layer as described in Example 1 and the coated material cured for five days and then post cured at 70° C. for seven hours in an oven.

In the abrasion resistance test, the film exhibited a loss of 0.1649 gram and the film also exhibited a Shore A hardness of 85.

We claim:

1. Pavement-marking sheet material comprising a polymeric top film and an underlying polymeric layer, the top film comprising aliphatic isocyanate-terminated component and hydroxyl-terminated component reacted to an infusible and insoluble polyurethane reaction product, at least 10 percent of the hydroxyl equivalents being provided by hydroxyl-terminated component having at least three hydroxyl groups per molecule, and the hydroxyl-terminated component having a number-average molecular weight of about 1,200 or less; the polymeric top film exhibiting a Taber abrasion loss using an H-22 abrader wheel with a 1,000-gram weight and 1,000 cycles of no more than about one-half gram, and containing particulate material selected from transparent microspheres and antiskid granules partially embedded in and partially protruding from the top layer; and the underlying layer undergoing a penetration in the penetration creep-recovery test described herein of at least 0.05 millimeter, and recovering no more than 65 percent of the penetration depth after two minutes.

2. Sheet material of claim 1 in which the hydroxyl-terminated component comprises polycaprolactone, polycarbonate, or polyether polymeric segments, at least 25 percent of the hydroxyl equivalents being proved by hydroxyl-terminated components of at least three hydroxyl groups per molecule, and the hydroxyl-terminated component having a number-average molecular weight of about 1,000 or less.

3. Sheet material of claim 1 in which the hydroxyl-terminated component includes a monomeric diol.

4. Sheet material of claim 1 in which the polymeric film has a thickness of at least about one-third millimeter.

5. Sheet material of claim 1 in which additional microspheres are dispersed throughout the polymeric film.

6. Sheet material of claim 1 in which additional antiskid granules are dispersed throughout the polymeric film.

7. Sheet material of claim 1 in which the reaction product of the polymeric film further includes tertiary amine.

8. Sheet material of claim 7 in which the tertiary amine comprises N-(t-butyl)diethanolamine in an amount equal to at least 0.5 hydroxyl equivalent for each equivalent of hydroxyl-terminated diol.

9. Sheet material of claim 1 in which the underlying layer comprises unvulcanized elastomer precursor.

10. Sheet material of claim 1 in which the underlying layer is at least about one-fourth millimeter thick.

11. Sheet material of claim 1 in which the top layer undergoes a penetration in the creep-recovery test described herein of less than 0.05 millimeter.

12. Sheet material of claim 1 in which the underlying layer is free of transparent microspheres.

13. Sheet material of claim 1 in which a layer of adhesive is included under the underlying layer.

14. Sheet material of claim 1 which the underlying layer can be stretched at least 50 percent before break.

15. Sheet material of claim 1 that exhibits a tear resistance in the nicked-film ASTM D-624 tear-resistance test described herein of at least about 5 kN/m.

16. Sheet material of claim 1 that exhibits an impact resistance in the Gardner Impact impact-resistance test described herein of at least about 2 joules.

17. Sheet material of claim 1 in which the hydroxyl-terminated component comprises polycaprolactone.

18. Sheet material of claim 1 in which the hydroxyl component comprises polycarbonate, or polyether polymeric segments.

19. Sheet material of claim 1 in which 25 percent of the hydroxyl equivalents is provided by hydroxyl-terminated components of at least three hydroxyl groups per molecule, and the hydroxyl-terminated component has a number-average molecular weight of about 1,000 or less.

20. Sheet material of claim 1 in which the polyurethane reaction product of the polymeric film includes a polymeric diol component in addition to the component having at least three hydroxyl groups per molecule.

21. Sheet material of claim 1 in which the polymeric top film has sufficient flexibility that it can be wrapped around a two-centimeter-diameter mandrel at room temperature without cracking.

22. A method for marking a paved surface comprising adhering sheet material of claim 1 to the paved surface.

23. Pavement-marking sheet material comprising a polymeric top film and an underlying polymeric layer, the top film comprising aliphatic isocyanate-terminated component and hydroxyl-terminated component reacted to an infusible and insoluble polyurethane reaction product, the hydroxyl-terminated component including polycaprolactone and at least 25 percent of the hydroxyl equivalents being provided by hydroxyl-terminated component having at least three hydroxyl groups per molecule, and the hydroxyl-terminated component having a number-average molecular weight of about 1000 or less; the polymeric top film exhibiting a Taber abrasion loss using an H-22 abrader wheel with a 1,000-gram weight and 1,000 cycles of no more than about one-half gram, and containing particulate material selected from transparent microspheres and antiskid granules partially embedded in and partially protruding from the top layer; and the underlying layer undergoing a penetration in the penetration creep-recovery test described herein of at least 0.05 millimeter, and recovering no more than 65 percent of the penetration depth after two minutes.

24. Sheet material of claim 23 in which the polyurethane reaction product of the polymeric film includes a polymeric diol component in addition to the component having at least three hydroxyl groups per molecule.

25. Sheet material of claim 24 in which the polymeric film has a thickness of at least about one-third millimeter.

26. Sheet material of claim 25 in which the polymeric top film has sufficient flexibility that it can be wrapped around a two-centimeter-diameter mandrel at room temperature without cracking.

27. Sheet material of claim 24 in which the polymeric top film has sufficient flexibility that it can be wrapped around a two-centimeter-diameter mandrel at room temperature without cracking.

28. Sheet material of claim 23 in which the polymeric film has a thickness of at least about one-third millimeter.

29. Sheet material of claim 28 in which the polymeric top film has sufficient flexibility that it can be wrapped around a two-centimeter-diameter mandrel at room temperature without cracking.

30. Sheet material of claim 23 in which the polymeric top film has sufficient flexibility that it can be wrapped around a two-centimeter-diameter mandrel at room temperature without cracking.

* * * * *